3,326,701
FORMATION OF SOLID BODIES
Helmut Von Freyhold, Dusseldorf-Oberkassel, Germany, assignor to Philadelphia Quartz Company, Philadelphia, Pa., a corporation of Pennsylvania
No Drawing. Filed Jan. 11, 1963, Ser. No. 250,791
Claims priority, application Germany, Jan. 16, 1962,
H 44,634
6 Claims. (Cl. 106—38.35)

INTRODUCTION

My invention generally relates to novel binder solutions which are designed to be admixed with refractory inert filler materials to form solid bodies (such as molds and cores used in foundries) which are or can then be solidified by treatment with $CO_2$ or other acidic gases.

THE PRESENT STATE OF THE ART

A mold for use in metal casting must be strong enough to sustain the weight of the metal poured into it so that the liquid metal after solidification retains the shape of the mold. It is also important that the mold material be easily separated from the solidified metal. Furthermore, the mold must permit any gas formed within the metal to be removed by permeation through the body of the mold rather than back through the metal. In addition, the mold must resist the erosive reaction of the rapidly moving stream of hot metal during pouring and must maintain its strength until the metal has solidified. Compressive strength must be low enough to permit the metal to contract without undue hindrance after solidification and this is especially important in the preparation of cores which are nearly surrounded by the solidifying metal.

The general practice of forming solid bodies, e.g. molds, cores, shells, insulation, etc. with ceramic bonds from inert refractory fillers, such as sand or clay, by setting an aqueous sodium silicate bond with an acidic gas such as $CO_2$ is well known. However, improvement of the general practice in certain directions has been widely desired. Controlling the green strength before gassing has been attempted by controlling the amount of binder added and the proportion of reaction permitted between the binder and the acidic gas. As a general rule, the less reaction the higher the green strength, but as the extent of the reaction was reduced, removal of the mold, or core, after casting of the molten metal in investment casting operations, for instance, became more difficult. In other words, with prior attempts to improve green strength the ease of "shake out" has been reduced. The strength of the mold before casting may also be increased by heating to dehydrate the silicate bond, but this of course requires an additional expense of fuel and time.

There also have been attempts to reduce the amount of acidic gas required. One unsuccessful expedient was to heat-treat the core in a higher frequency field. Such methods have generally been complicated and time-consuming.

THE NOVEL BINDER SOLUTIONS

I have discovered that novel and highly useful binder solutions can be produced from an admixture of two binder components, namely:

(a) a solution of an alkali metal silicate, and
(b) an alkali metal hypochlorite.

THE ALKALI METAL SILICATE SOLUTION

The preferred alkali metal silicate solutions are aqueous sodium or potassium silicate solutions having a mol ratio of $SiO_2$ to alkali metal oxide of about 1.4 to 4.4 and a concentration of 38 to 60° Baumé. Most preferably, the mol ratio varies from 2.4 to 2.7 and the gravity from 46 to 52° Baumé.

THE ALKALI HYPOCHLORITE

The preferred alkali hypochlorite in accordance with my invention is sodium hypochlorite. The sodium hypochlorite may be in any form desired so long as it is capable of mixing with silicate solution without gelation. Commercial sodium hypochlorite is prepared by the introduction of chlorine gas into a sodium hydroxide solution forming "soda bleach liquor" containing from about 12 to 18% by volume of available $Cl_2$: for instance, 140 grams of $Cl_2/l$. and 147 grams of NaOCl/l. with the equivalent weight of NaCl and, in addition, 14.0 grams of NaOH. Such a solution has a specific gravity of 1.196 grams/ml. at 70° F. Other solutions may contain as little as 3% available $Cl_2$.

THE RELATIVE AMOUNTS OF THE BINDER COMPONENTS AND ADMIXTURE THEREOF

The amount of alkali hypochlorite is not critical and may be varied over a wide range but generally only a small amount is required, and a larger addition makes no substantial improvement insofar as the final product is concerned. By way of example, when using an alkali metal silicate solution having a mol ratio of $SiO_2:Na_2O$ of 2.7 at about 48° Baumé, an amount of sodium hypochlorite equivalent to 5 to 20% by weight of the soda bleach liquor described above, based on the amount of alkali metal silicate solution, is generally sufficient. Those skilled in this art will realize that by simple experimentation they can ascertain the relative amounts of the two binder components which will give the best result for the particular conditions under which their binder solution is to be used.

UTILITY OF BINDER SOLUTION

The novel binder solutions of this invention are useful in forming solid bodies (such as molds and cores) by admixing an appropriate amount of the binder solution with an inert refractory filler. The admixture of the binder solution and the inert refractory filler can then be "set" or solidified by treatment or "gassing" with $CO_2$ or other acidic gas according to techniques well known to the art. Suitable examples of inert refractory fillers would include quartz sand or other forms of silica; aluminia; zirconia, or zircon; clays such as feldspars and kaolinites; beryl; olivine; wollastonite; asbesto; flurospar; nepheline syenite; molybdenum disilicide; boron nitride; sillimanite; mullite, chamotte; etc. The amount of the inert refractory filler in relation to the binder solution may vary widely, and is only limited on the one hand by a combination which is too soupy to assume the desired shape, or so dry that premature crumbling occurs.

INCLUSION OF ADSORBENT ORGANIC SUBSTANCES

I have also found that it is desirable to add to the alkali metal silicate solution, or to the inert fillers making up the solid body, small amounts of adsorbent organic substances which react very little, or not at all, with the hypochlorite component at ordinary temperatures; that is, at room temperatures. The addition of these adsorbent organic compounds appears to help avoid the release of free chlorine while gassing with $CO_2$ to set the binder. It also appears that these adsorbent organic compounds react with nascent oxygen during the casting of the metal and thus increase the rate of removal of gases from the metal and the ease of shake-out after the casting is cooled. I especially prefer to use carbon as one of the organic adsorbing substances, but other materials such as sugar, wood, flour, molasses, carbon, pitch, etc. which are converted to carbon, carbon monoxide or carbon dioxide by the heat of the casting process may be used. Among other materials, I have found that the alginates, such as sodium alginate, improve the properties of the cores. In general these organic materials may be added in the amount of 0.2 to 1.0% based on the weight of the filler.

OTHER ADVANTAGES OF THE INVENTION

In addition to the advantages which are apparent from the above description, it is worth mentioning that the strength of the solid bodies, such as the molds or cores, prepared according to my invention are considerably greater than that of the molds or cores prepared with binder solutions consisting only of an aqueous alkali metal silicate. Furthermore, in addition to increasing the green strength, the collapsibility of the mold after pouring of the hot metal is actually increased instead of decreased. In other words, shake-out time is decreased. Thus, the time required for cleaning the castings is reduced and the sand, or other inert refractory filler, is readily broken up and poured out of the casting.

Moreover, by the addition of the alkali metal hypochlorite to the alkali metal silicate solution, the amount of $CO_2$ or acidic gas necessary for hardening is considerably reduced and excessive quantities of the acidic gas do not harm the cores as often happens with the previous binders.

Another advantage of my process is that the nascent oxygen given off by the hypochlorite during the casting of the metal forms passageways through the mold for the removal of the gases from the cooling metal. When carbon or other organic material is present the nascent oxygen helps to burn the carbon away, thus aiding in the removal of the gases from the metal and also increasing the ease of crushing of the core during the final stages of solidification of the metal.

EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric unless otherwise indicated.

*Example 1*

100 grams of sodium silicate solution having a mol ratio of $SiO_2$ to $Na_2O$ of 2.7 and a specific gravity of 48° Baumé were mixed with 10 grams of the sodium bleach liquor (140 grams $Cl_2/l$.) described previously. Coarse sand was mixed with 4% of the above binder solution and then the core was hardened by blowing with $CO_2$. A blowing time of only 3 seconds was required in comparison with a blowing time of 10 to 12 seconds that is required under otherwise equal conditions when alkali hypochlorite was not included in the binder solution. This indicates that less $CO_2$ was required.

The green strength of a core formed with only alkali metal silicate as a binder was 17.7 kg. whereas the strength of the core formed with the mixture described above was 38 kg. Similarly, the cleaning time was decreased from 30 seconds, when using a hypochlorite-free sodium silicate binder solution, to 22 seconds when working with the described mixture.

*Example 2*

A foundry sand was mulled with 4% by weight of a binder solution prepared from an admixture of 100 grams of a sodium silicate solution (having a mol ratio of 2.4 $SiO_2$:1 $Na_2O$ and a specific gravity of 52° Baumé) with 15 grams of the above sodium bleach liquor containing 140 grams of $Cl_2/l$. At the same time, 0.3% by weight of finely divided carbon based on the weight of the sand was mixed in. After hardening with $CO_2$ gas, a solid body was obtained with properties equivalent to those described in Example 1. Practically no free chlorine was observed during the gassing of this body.

*Example 3*

100 kg. of sodium silicate solution (having a $SiO_2$:$Na_2O$ ratio of 2.7 and a specific gravity of 46° Baumé) were mixed with 10 kg. of the above sodium bleach solution containing 140 grams of $Cl_2/l$. To this composition was added, with agitation, 10 kg. of an aqueous solution containing 2% by weight of sodium alginate. 4% by weight of this mixture was mulled with a core sand and the core hardened as described in Example 1. This resulted in a core with properties equivalent to those in Example 1 and the core had an especially smooth surface.

Those skilled in the chemical arts, and particularly in the art to which this invention pertains, will readily appreciate that many modifications of the basic invention set forth here are possible. All of these modifications are considered to be within the scope of the present claims by virtue of the well-established doctrine of equivalents.

The term "consisting essentially of" as used in the following claims is meant to include compositions containing the named ingredients and any other ingredients which do not destroy the usefulness of the compositions for the purpose as stated in the specification.

What is claimed is:

1. A method for the preparation of molded particles which consists essentially of:
    (a) providing an aqueous sodium silicate solution having an $SiO_2$:$Na_2O$ mol ratio ranging from 1.4 to 4.4 and a concentration ranging from 38 to 60° Baumé,
    (b) admixing with said sodium silicate solution an aqueous solution of alkali metal hypochlorite containing from 3 to 18% available chlorine by volume to thereby form a binder composition,
    (c) mixing said binder composition with a refractory inert filler in the amount 2 to 10% by weight based on the weight of the filler,
    (d) shaping in the desired form,
    (e) passing an acidic gas therethrough, thereby forming a solid body having a green strength in excess of that obtained when sodium silicate alone is used as a binder composition.

2. The method of claim 1 in which an adsorbent organic substance is included in the compositions in a proportion of 0.2 to 1% by weight based on the weight of filler.

3. As a product, the solid body formed by the method of claim 1.

4. As a product, the solid body formed by the method of claim 2.

5. A molding composition comprising an admixture of an inert refractory material and a binder composition consisting essentially of:
    (a) 80–95% by weight of an alkali metal silicate solution, and
    (b) 5–20% by weight of an alkali metal hypochlorite.

6. A molding composition according to claim 5 wherein the binder composition additionally contains .2–1.0% by weight of an organic adsorbent substance.

(References on following page)

References Cited

UNITED STATES PATENTS

| | | | |
|---|---|---|---|
| 2,494,403 | 1/1950 | Nies et al. | 106—38.35 |
| 2,647,069 | 7/1953 | Stericker | 106—74 XR |
| 2,770,860 | 11/1956 | Webbere | 22—214 |
| 2,926,098 | 2/1960 | Ilenda et al. | 106—38.35 |
| 2,935,772 | 5/1960 | Shaw | 22—214 |
| 3,018,528 | 1/1962 | Horton | 22—195 |
| 3,042,982 | 7/1962 | Mountford et al. | 22—195 |
| 3,255,024 | 6/1966 | Alexander et al. | 106—38.3 |

FOREIGN PATENTS 494,623 11/1938 Great Britain.

OTHER REFERENCES

The Condensed Chemical Dictionary, Sixth edition, Reinhold Publishing Corporation, New York (pages 1044 and 1053 relied on).

ALEXANDER H. BRODMERKEL, *Primary Examiner.*

DANIEL J. ARNOLD, MORRIS LIEBMAN, *Examiners.*

J B. EVANS, *Assistant Examiner.*